March 2, 1971      L. F. MILLER      3,567,242

WHEELED COASTER DEVICE

Filed June 26, 1969

INVENTOR

LARRY F. MILLER

BY:

*Oldham & Oldham*

ATTORNEYS

United States Patent Office 3,567,242
Patented Mar. 2, 1971

3,567,242
WHEELED COASTER DEVICE
Larry F. Miller, 366 Tolbert St.,
Wadsworth, Ohio 44281
Filed June 26, 1969, Ser. No. 836,866
Int. Cl. B62b 11/00
U.S. Cl. 280—87.04
7 Claims

ABSTRACT OF THE DISCLOSURE

A coaster device is composed of a platform beneath which are mounted three wheels, arranged in the form of a triangle. Two of the wheels are each provided with separate steering means while the third wheel is free to pivot about its vertical axis. The platform is preferably triangular and is of sufficient size and strength to support one or more persons in a sitting or kneeling position. Casters are preferably used for the wheels. The caster stems for the two steerable wheels are each keyed to one end of a tubular shaft extending vertically through the platform. A suitable handle is attached to the other end of each shaft.

BACKGROUND OF THE INVENTION

A typical skate board or coaster is composed of a suitable platform or other support to which rollers, wheels or other means are connected to permit movement of the platform along the ground. Except for those that are self propelled, most skate boards or coasters must be used on a hill or slope. The device may be steered by the body movement of the operator, as in the case of a skate board. Alternatively, steering means may be provided to turn one or more of the wheels. Many coasters are supported on three wheels, one in front and two in the back. With some of these, all three wheels swivel freely. On others, one wheel is turned by suitable steering means while the two wheels are permitted to swivel or pivot freely, in response to the directional movement of the coaster. Both types of coasters have somewhat limited maneuverability.

BRIEF DESCRIPTION OF THE INVENTION

One object of the present invention is to provide a coaster which is highly maneuverable and which has two wheels in front and one wheel in the back.

Another object is a three-wheeled coaster provided with steering means which enables the rider to pivot coaster from side to side and alter the direction of the coaster quickly and effectively.

Yet another object of the present invention is a three-wheeled coaster which is simple in design, yet is of sturdy construction.

These and other objects are accomplished in the manner to be hereinafter described with particular reference to the drawings in which:

DETAILED DESCRIPTION OF THE INVENTION

Figure 1:
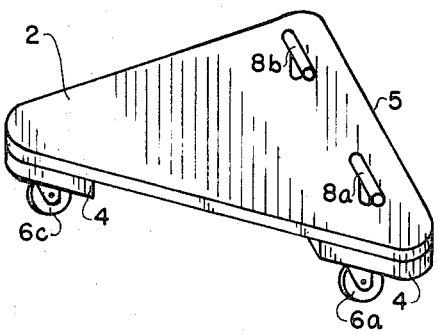
FIG. 1 is a perspective view of a coaster of the present invention.

FIG. 1 shows a triangularly shaped coaster comprising a generally planar platform 2 made out of suitable material such as wood, plastic or the like, reinforced at the corners by suitable size strengthening members 4, glued, nailed or otherwise secured to the platform. The platform should generally be light-weight, yet sufficiently strong to carry the weight of an adult or a child. Typically the platform is in the shape of a right or isosceles triangle each side of which is at least two feet in length. In a preferred embodiment, the platform is made from ½ inch plywood and the corners are reinforced with three quarter inch triangular plywood reinforcing members. This stucture is light-weight, strong and inexpensive.

Mounted on the underside of the platform are three wheels, two of which, 6a and 6c, are shown in FIG. 1. Projecting from the top of the platform 2 along the front edge 5 thereof are two handles 8a, 8b by which the two front wheels 6a and 6b are turned. Each handle is joined to one wheel for turning the wheel about its vertical axis. The handles are not connected to each other in any way. Thus the operator must use both hands, one on each handle, to maintain control of the coaster in motion. This permits much more maneuverability than would be possible through the use of a singular steering means for both wheels.

Figure 2:
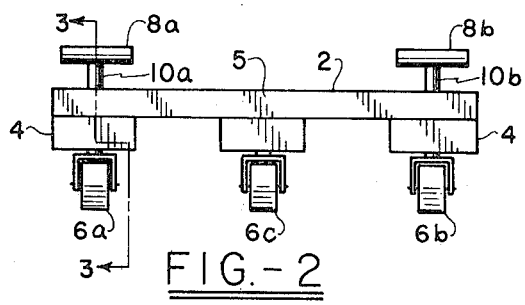
FIG. 2 is a front elevational view of the coaster.

FIG. 2 is a head-on view of the coaster showing the two handles 8a, 8b, each connected to a vertical steering column 10a, 10b, in turn joined to one of the wheels 6a, 6b. The wheel shown in the middle of FIG. 2 is the rear wheel 6c seen in FIG. 1. This wheel is free to rotate about its vertical axis.

Figure 3:
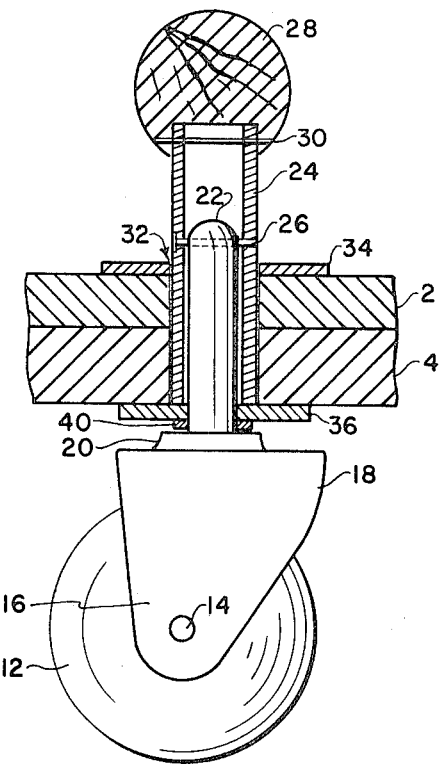
FIG. 3 is a view, partially in cross-section, taken along lines 3—3 of FIG. 2.

FIG. 3 is a cross-sectional view showing the steering arrangement for the two front wheels 6a, 6b. Each wheel is a typical caster wheel 12 made out of rubber, plastic, metal or other suitable material. The wheel 12 is mounted on an axle 14 held between two downwardly depending sides 16 of a U-shaped support or yoke 18. The support is connected to a caster stem 22 and a metal disc 20 is secured to the support to serve as a bearing surface. The stem 22 extends into a tubular steering member 24 and is held therein by suitable means such as a pin 26, rivet or bolt extending through the tubular member 24 and the caster stem 22. The tubular steering member 24 extends through a hole 32 drilled through the platform 2 and the reinforcing member 4. On either side of the hole 32 are suitable plates 34, 36, screwed to the platform 2 and reinforcing member 4 to prevent splintering and splitting of the wood around the hole 32. The steering member 24 projects above the platform 2, and a handle 28 such as a one inch wooden dowel, drilled or otherwise provided with a suitable hole, is attached to the upper end of the member 24 by pin 30 or other suitable securing means.

A washer 40, of metal or a low friction plastic such as Teflon or nylon is desirably placed between plate 36 and disc 20 to provide a low friction surface, thereby facilitating rotation of the wheel 12 about the stem. Alternatively, a ball bearing race can be used to transmit turning torque with a minimum of frictional resistance. Rotation of handle 28 is transmitted by steering member 24 to the caster stem 22, thereby causing the wheel 12 to pivot about its vertical axis.

As described, the coaster is provided with a simple, yet effective steering means for independently, but effectively controlling the two front wheels, 6a, 6b. It should be understood that the third wheel 6c is not connected to any steering means, but instead is free to swivel about its vertical axis. The third wheel is typically a caster wheel of the type previously described, with a caster stem held in an appropriate socket embedded in a hole within the rear reinforcing member 4 and platform 2. The caster stem should be freely pivotable about the vertical axis, preferably but not necessarily on a ball bearing race. Instead of a stem caster, a plate caster, screwed or bolted to the underside of the platform can be used as the rear wheel. The dimensions of the rear wheel are normally the same as those of the two front wheels.

The use of independent steering means for two of the wheels permits the operator to skillfully turn the coaster and to change directions with ease. With practice he can learn to perform many unusual and complex feats with this novel coaster.

Figure 4:
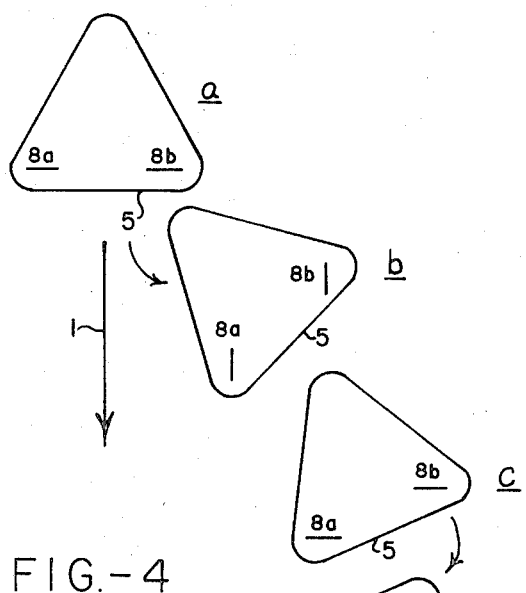
FIG. 4 is a top view of the coaster in operation, showing in sequence the response of the coaster to various steering maneuvers.
Figure 4:
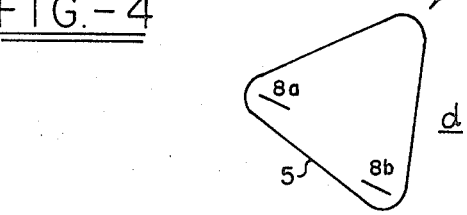

FIG. 4 typically shows a coaster of the type herein covered by the present invention, traveling down a slope, or being propelled along a level surface by suitable means. The large arrow 1 shows the general direction of movement. In FIG. 4a, the two handles 8a and 8b are in the normal position, parallel to the front edge 5 of the coaster and at right angles to the arrow 1. The wheels 6a and 6b are at right angles to the handles and are pointing straight forward, in the direction of the arrow 1.

Turning the front wheels counterclockwise, will cause the coaster to turn or veer to the left (as shown in FIG. 4b). Quickly turning the handles 8a and 8b to the same position with respect to the slope that they were in FIG. 4a will cause the coaster to proceed sideways down the hill as shown in FIG. 4c. If the right handle 8a is then turned without turning the left handle, 8b, the coaster will abruptly pivot about the right wheel 6a as shown in FIG. 4d. As noted in FIG. 4e, turning both handles to face the same direction as the arrow 1 will cause the coaster to again proceed in a straight line down the hill, but with the front 5 of the coaster facing in a direction corresponding to the position reached by the coaster during its pivotal movement about wheel 6a. In FIG. 4f, both handles are turned clockwise to again change the direction of the coaster. With practice, the operator can turn, pivot and stop quickly and with precision.

There are many modifications that can be made in the design and construction of the novel coaster of the present invention, while remaining within the scope of the invention. For example, it is not necessary that the platform be triangular in shape. Instead it could be circular or square and can be large enough to hold two or more persons. The operator can sit, kneel or lie on the platform, and can operate the two independent steering means with his hands or with his feet. By using longer steering members 24, the operator can even stand on the coaster while steering the same. The platform may be simple or complex, as desired, and may be outfitted with a seat, footrests, bumpers and the like. The members 4 may be of any desired vertical thickness to aid in control of the heighth of the platform from the ground.

The size and location of the three wheels beneath the platform can be varied, depending upon the design and size considerations involved, so long as two of them can be operated by separate control means and the third one can swivel freely about its vertical axis.

These and other modifications can be made without departing from the scope of the invention which is delimited by the following claims in which I claim.

What is claimed is:
1. A coaster device comprising:
  a generally planar platform,
    three ground contacting wheels on the underside of the platform positioned in a triangular arrangement, all three wheels being free to swivel about the vertical axis normal to the axis of rotation, and
  separate control means for independently turning each of two of the wheels about its vertical axis.
2. A device according to claim 1 wherein each of said control means comprises a handle located above the platform and secured to a tubular member extending through the platform and in engagement with the wheel to turn the wheel about its vertical axis.
3. The device according to claim 2 wherein each of the controlled wheels is composed of a caster wheel with a caster stem extending into and keyed to the tubular member.
4. The device according to claim 3 wherein the platform is in the shape of an equilateral triangle.
5. A coaster device composed of a generally planar triangularly shaped platform of sufficient size and strength to support a person in a sitting position and three ground contacting wheels mounted on the underside of the platform at the three corners thereof, each wheel capable of swiveling about its vertical axis, the improvement comprising separate manual controls for two of the wheels, each control composed of a handle, and a tubular shaft joined to the handle and to the wheel.
6. The device according to claim 5 wherein each of the controlled wheels are caster wheels supported in a yoke, and the tubular shaft is keyed to a caster stem integrally joined to the yoke.
7. The device according to claim 6 wherein the platform is fabricated from wood, and three corners of the platform are reinforced with wood.

References Cited
UNITED STATES PATENTS

| | | | |
|---|---|---|---|
| 887,812 | 5/1908 | Johnson | 280—87.04(A)UX |
| 1,467,453 | 9/1923 | Remacle | 280—87.04UX |
| 2,001,647 | 5/1935 | Alt | 280—91 |
| 3,174,769 | 3/1965 | DeVoghel | 280—91 |

LEO FRIAGLIA, Primary Examiner

U.S. Cl. X.R.

280—91